United States Patent Office 3,008,886
Patented Nov. 14, 1961

3,008,886
PRODUCING POLYMERIZED MATERIALS BY IRRADIATION
Anthony D. Sarantites, Athens, Greece, assignor to Plastonics Corporation, Moorestown, N.J., a corporation of New Jersey
No Drawing. Filed June 28, 1956, Ser. No. 594,394
5 Claims. (Cl. 204—162)

The present invention relates to an improved method of producing polymerized materials.

I have found a new method and process for producing polyethylene macromolecules, using for this purpose cheaper and more abundant materials than ethylene and propylene. Up till now polyethylene is produced by polymerizing the double bond unsaturated hydrocarbons such as ethylene, propylene, etc.

My process involves the polymerization of the reaction product of the saturated hydrocarbons, known as alkanes, of any chain length in equal molecular proportions either with the triple bond unsaturated hydrocarbons, that is the alkynes, the alkadiynes, the alkatriynes, etc., such as is the acetylene, the ethylene alkynes, or with alkadienes, like the propadiene, the 1,2-butadiene, etc., or with the alkatrienes, etc. The saturated hydrocarbons used may be: methane, ethane, propane, n or iso-butane, the pentanes (normal, iso, neo), the hexanes, etc., and all the rest saturated hydrocarbons presented under the general chemical formula: $C_nH_{2n+2}$, in any of their forms (normal, iso, neo-, 2-ethyl-, 3-ethyl-, etc.).

Because ethylene and propylene, n-butene, etc. are very limited in comparison with the abundance of the saturated hydrocarbons, and the price of the latter general class of hydrocarbons is lower, this process will help to a great extent not only the production of cheaper polyethylene materials but it will make possible as well the production of such materials to any amount that the needs of the market will require.

I have found also that when the hydrocarbons of the formula $C_nH_{2n+2}$ have the n number of carbon atoms even, the polymerization reaction with acetylene proceeds to completion, and I can go to any extension of the degree of polymerization I desire.

Also, I have found out that if the straight chain $C_nH_{2n+2}$ hydrocarbons is composed of odd numbers of carbon atoms, that is, whenever $n$ is any odd number, then the reaction can be completed only if I react them with (a) alkadiynes, such for example as is the butadiyne: $CH\equiv C-C\equiv CH$, etc., or (b) with the alkatriynes, the alkatetriynes, etc., or (c) with the alkadienes (or the alkatrienes, the alkatetrienes, the alkapentienes, etc.).

If I react with the alka-diynes-triynes-tetriynes, etc., then the reaction if prolonged will have cross links as well as unsaturated double bond and triple bond pairs of carbon atoms, depending upon the type and degree of unsaturation of the reacted unsaturated hydrocarbons.

But, if I react the odd n number type of alkanes with alkadienes which have two pairs of double bond carbon adjoining one another, like for example the 1,2-butadiene: $CH_2=C=CH-CH_3$, or the 1,2-3 methyl butadiene: $CH_2=C=C(CH_3)_2$, or the propadiene $CH_2=C=CH_2$, or the $R_1CH=C=CH_2$, or $(R_1)(R_2)C=C=CH_2$, or the $(R_1)(R_2C=C=CH(R_3)$, etc., where $R_1$, $R_2$, $R_3$, etc. may be any alkyl radicals, either in a straight chain configuration of their component carbon atoms, or in any branched chain configuration, then the reaction proceeds to completion and I can react them to any desired degree of polymerization.

Also, I have found out that for the branched chain types of alkanes, the reaction proceeds to completion whenever even if only one of the branched alkyl radicals has an even number of carbon n atoms. If, though, all branches $R_1$, $R_2$, $R_3$, and $R_4$ of the alkanes:

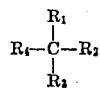

are composed all of any odd number of carbon atoms, then the polymerization does not proceed to completion even if any of the R's or even two of the R's may be hydrogen atoms provided a branch contains an even number of C's.

The reactions of my process taking place in general can be represented as follows:

(I) 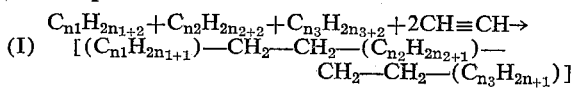

in which $n_1$, $n_2$, $n_3$. . . may be any even number.

For such saturated hydrocarbons higher than ethane, the above reaction steps can be completed and be shown more clearly: (a) Before the polymerization state, the reaction proceeds as follows:

(II)

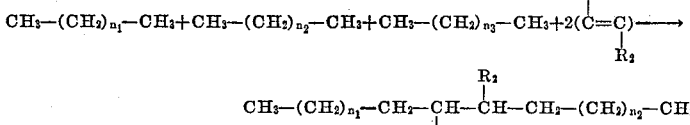

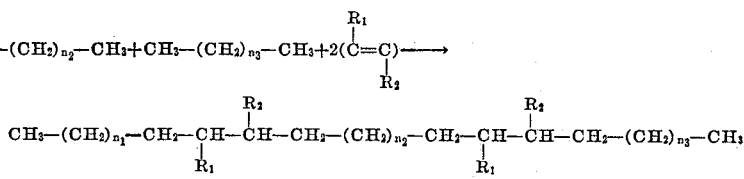

in which $n_1$, $n_2$, $n_3$, etc. may be any number, and $R_1$ and $R_2$ may be either hydrogen atoms or any alkyl radical. The same result takes place also whenever any hydrogen atom of the $C_nH_{2n+2}$ molecules will be substituted by any alkyl radical. (b) Completing the above reaction I get:

(III)

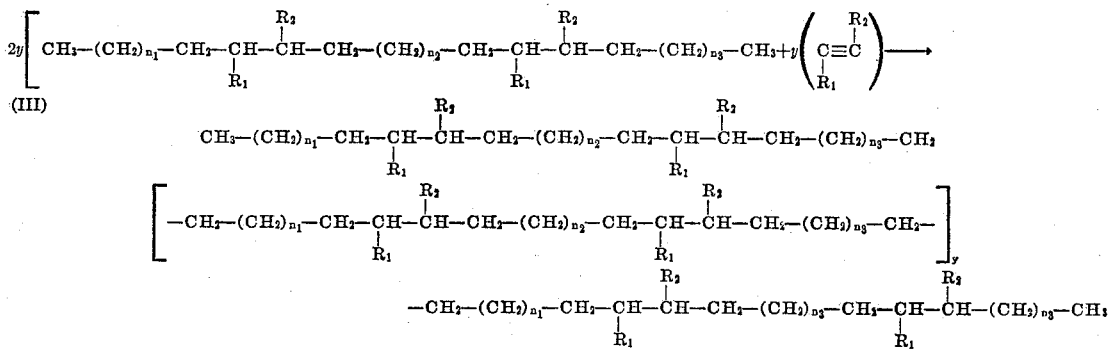

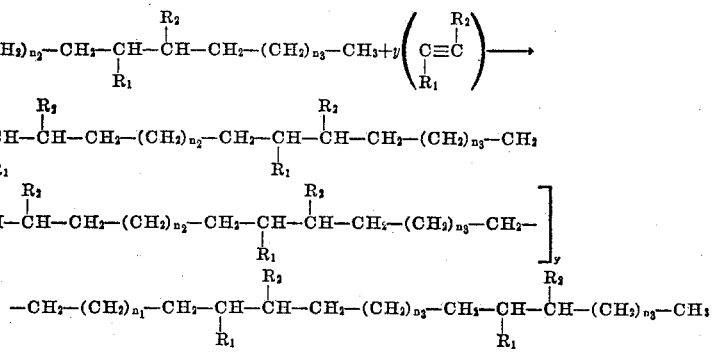

in which $y$ may be any number desired for the polymerization end product, and $n_1$, $n_2$, $n_3$ may be any even number.

If we start with methane gas and the propadiene the step proceeds with molecular proportions of the $CH_4$ and the $CH_2=C=CH_2$:

(IV) 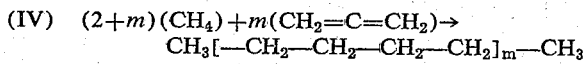

The same as in (IV)) is true for the even number of carbon atoms:

(V) 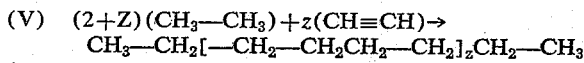

In case of a mixture of saturated hydrocarbons with any even number of carbon atoms to be reacted with acetylene or its homologues, we should make percentage analysis by weight at first of the saturated hydrocarbons as in Example III. In such a case, suppose that we have found that we have 4 saturated hydrocarbons in this mixture of liquid or gas:

$CH_3—(CH_2)_{n_1}—CH_3$ having molecular weight $M_1$
$CH_3—(CH_2)_{n_2}—CH_3$ having molecular weight $M_2$
$CH_3—(CH_2)_{n_3}—CH_3$ having molecular weight $M_3$, and
$CH_3—(CH_2)_{n_4}—CH_3$ having molecular weight $M_4$ the $n_1$, $n_2$, $n_3$, $n_4$, etc. representing even numbers.

Now, if the percentages by weight are:

$P_1$ for $M_1$
$P_2$ for $M_2$
$P_3$ for $M_3$, and
$P_4$ for $M_4$

I have found that I can add the following amount of acetylene by weight:

$$26 \quad \frac{P_1M_2M_3M_4+P_2M_1M_3M_4+P_3M_1M_2M_4+P_4M_1M_2M_3}{M_1M_2M_3M_4}$$

in the order as shown in Example I, in order to complete the polymerization to the desired degree.

The reaction steps of this process proceed faster and at lower temperatures and pressures when the molecular weights of the saturated hydrocarbons to be reacted with acetylene or its homologues are of the lower molecular weight order.

I have found that not only the temperatures of polymerization will vary relatively proportionally with the molecular weights of the reacting $C_nH_{2n+2}$ hydrocarbons, but the speed is still more greatly helped either (a) by the presence of certain polymerization favoring reagents known as catalysts helping the agitation and collision forces brought about by the heat-agitation-pressure system, or (b) by the further agitation and interpenetration of the reacting clouds of the atoms composing the molecules which can be brought about by introducing or treating the reacting masses with X-rays, or ultra-violet rays, or gamma rays, or ultrasonic beams using any one of them alone or in any of their combinations, together with or without any of the catalysts.

Catalysts such as the ones generating oxygen, or catalysts capable of transferring hydrogen such as LiH, or $LiBH_4$, or $LiAlH_4$ or Li metal in its colloidal state—in minute quantities—favor greatly this type of polymerization. But, still greater is the speed brought about by the utilization of any one or of any combination of the above mentioned rays or beams with the condition that the time and intensity of the injected gamma rays should be shorter and smaller respectively than with the other rays.

The polymerization can proceed from 50° C. to 300° C. depending on the type of the raw materials used being relatively proportional to the chain length of the reacted saturated hydrocarbons as well as on the degree of polymerization desired. Also, the pressures can vary between 1–600 atmospheres again varying in proportion as above stated for the temperatures. The above limits of temperatures and pressures will also vary and in relation to the catalysts used and as to the type and time or time intervals of the used injected rays or beams.

In the following examples I illustrate how this invention can be applied, in which any of the above-mentioned variations can prolong or shorten the polymerization as to time and degree of polymerization:

*Example I.*—In a suitable reacting vessel, from which atmospheric air has been evacuated, I introduce a mixture of the saturated hydrocarbons: 5 gram moles of n-hexane and 5 gram moles of n-octane, together with suspended finally pulverized LiH, or, colloidal Lithium metal in minute amount. This mixture I introduce gradually together with the equal molecular proportions of 10 gram moles of purified acetylene gas, corresponding for each gram molecule of the hydrocarbons $C_nH_{2n+2}$ one gram molecule of acetylene. The vessel is gradually brought to 130° C. while stirring and keeping the pressure up to 10 atmospheres. As the reaction proceeds the pressure gradually drops to normal atmospheric pressure. While agitating I treat the material at intervals with strong intensity doses of X-rays generated from an 1-m.e.v. accelerator, the time of the repeated treatment depending upon the degree of polymerization required. Gradually now I raise the temperature up to 160° C. The above pressures can be reduced if the mass while being agitated is subjected to sound waves from an ultrasonic beam generator. When the pressure has dropped and while the polymerized material is withdrawn by a suitably heated draw-off valve, new material is introduced as above. Care should be taken that the temperature of the vessel be well controlled due to the exothermic properties of these reactions. Also, to avoid overheating I heat the vessel by a heated liquid circulating in the jacket of the vessel. I could use induction heating, but due to cooling needs I use liquid heating medium.

*Example II.*—An equal molal proportion of methane gas and propadiene gas is introduced in the reaction vessel from which all atmospheric air has been excluded. A small amount of octane liquid, in which is suspended minute amounts of finely pulverized LiH or of colloidal Li, is introduced. I raise now the temperature gradually and keep it at 100° C., taking care so that the resulting pressure does not pass a maximum of 120 atmospheres. As the reaction proceeds the pressure drops. When the presure drops considerably and reaches the atmospheric pressure, while stirring or otherwise agitating the material, I treat the latter with strong doses of X-rays generated from an 1-m.e.v. accelerator repeatedly at intervals. Then when the viscosity has been raised considerably, I raise the temperature gradually to 150° C. While still stirring and the viscosity increases, I treat again the material at intervals with the same strong doses of X-rays. This is continued until the desired viscosity of the melted material is reached. At the selected point of viscosity I withdraw the polymerized material through the heated draw-off valve and I repeat the same cycle with new material as above.

*Example III.*—In the same kind of reaction vessel as mentioned in Examples I and II, and from which I have excluded all atmospheric air, I introduce a mixture of one gram mole of ethane gas and one gram mole of propene (propylene) gas, both mixed with one gram mole of acetylene gas. Then I inject inside this mixture a minute amount of collodial lithium metal suspended with a few cc. of octane liquid. Now I raise the temperature gradually up to 100° C. and take care so that the pressure does not pass the 10 atmospheres mark. While agitating the material and when the pressure drops back to normal, I treat the material at intervals with strong doses of x-rays generated by a 1-m.e.v. accelerator. When the viscosity of the materials inside the vessel has increased considerably, I raise gradually the temperature of the reacting masses up to 150° C. while stirring or otherwise agitating them. When the pressure ter a short time drops again back to normal, I treat again the materials at frequent intervals with the same strong doses of X-rays generated by the 1-m.e.v. accelerator, and take care so that the temperature does not pass over 150° C. When the viscosity of the materials inside the vessel has reached the desired point at the above-mentioned temperature, I evacuate the material as mentioned in the above examples and repeat the cycle with new materials.

The produced polyethylene I have found to have the formula:

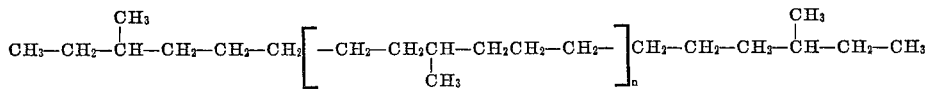

and it has the same good quality properties of the known polyethylenes for extrusion and injection molding technic purposes.

*Example IV.*—Proceeding as in Example III, I react a mixture of one gram mole of 3-ethyl-2-methyl hexane:

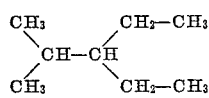

with one gram mole of acetylene as follows:

I introduce in a vertically elongated cylindrical reaction vessel, previously washed by $H_2$ gas of the presence of any atmospheric air, one gram mole of the hydrocarbon 3-ethyl-2-methyl hexane in which I have suspended previously minute amounts of finally pulverized lithium hydride. Gradually, I raise now the temperature to 60° C. and I treat it while vigorously stirring with strong doses of X-rays generated from the 1-m.e.v. accelerator. Then stopping the irradiation, I raise the temperature up to 125° C. while introducing from the bottom of the vessel the acetylene gas of the equivalent proportion of one gram mole and continuously I stir the contents. When all of the acetylene gas has been introduced I do not let the pressure raise to more than 6 atmospheres, and the temperature more than 150° C. As the acetylene is being absorbed, the viscosity increases. While keeping the temperature constant at 150° C., when the pressure drops back to normal, I treat again at intervals and repeatedly the mass with strong doses of X-rays as above, and I keep this procedure until all the mass has acquired the desired viscosity. Then I evacuate the vessel of the polymerized side branched polyethylene and repeat this procedure with new batches.

The produced polyethylene is clear and I have found to be a mixture of the following polymers (A) and (B):

(A)
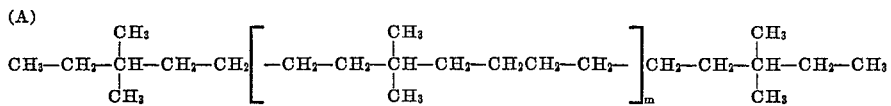

and (B)
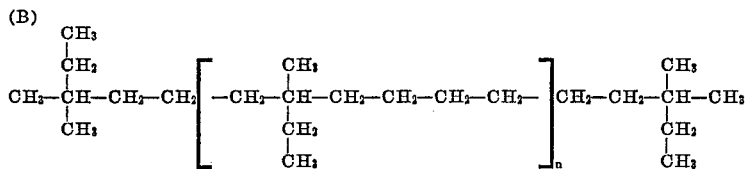

The expression "high energy ionizing radiation" as used in the appended claims is intended to include all the different types of radiation mentioned in the foregoing specification including ultraviolet and ultrasonic radiation.

I claim:
1. The improved process for the production of hydrocarbon polymer materials comprising reacting a hydrocarbon of the formula $C_nH_{2n+2}$ wherein $n$ is an integral number with a compound of the formula $R_1$—C≡C—$R_2$ wherein $R_1$ and $R_2$ are selected from the group consisting

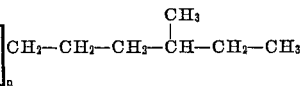

of hydrogen and alkyl radicals at a temperature between 50° C. and 250° C. and at a pressure not less than atmospheric, and subjecting the reactants to high energy, ionizing radiation while reacting.

2. The improved process for the production of hydrocarbon polymer materials comprising reacting a saturated hydrocarbon of the formula $C_nH_{2n+2}$, in which $n$ is an even number, with a compound of the formula $$R_1\text{—}C\equiv C\text{—}R_2$$

wherein $R_1$ and $R_2$ are selected from the group consisting of hydrogen and alkyl radicals at a temperature between 50° C. and 250° C. and at a pressure not less than atmospheric, and subjecting the reactants to high energy, ionizing radiation while reacting.

3. The improved process in accordance with claim 1 wherein said reaction is effected in the presence of a catalyst.

4. The improved process in accordance with claim 3 wherein said catalyst is selected from the class consisting of colloidal lithium, LiH, LiBH$_4$, and LiAlH$_4$.

5. The improved process in accordance with claim 2, wherein said reaction is effected in the presence of a catalyst.

References Cited in the file of this patent

UNITED STATES PATENTS

| | | |
|---|---|---|
| 2,636,853 | Franklin | Apr. 28, 1953 |
| 2,743,223 | McClinton | Apr. 24, 1956 |
| 2,872,396 | Wilson | Feb. 3, 1959 |

OTHER REFERENCES

Bovey: "Effects of Ionizing Radiation on Natural and Synthetic High Polymers," page 1 (1959).

Collinson et al.: "Chemical Reviews," vol. 56, N. 3, pp. 477–484, June 1956.

Charlesby: "Radiation Research," pp. 96–107, February 1955.

UNITED STATES PATENT OFFICE
CERTIFICATE OF CORRECTION

Patent No. 3,008,886                          November 14, 1961

Anthony D. Sarantites

It is hereby certified that error appears in the above numbered patent requiring correction and that the said Letters Patent should read as corrected below.

Column 2, line 14, insert a closing parenthesis after "$R_2$", first occurrence; same column, line 38, for "$(C_{n_3}H_{2n+1})]$" read -- $(C_{n_3}H_{2n_3+1})]$ --; column 3, line 36, in the formula, insert a closing parenthesis immediately following "$M_3$"; column 4, line 33, for "overheaing" read -- overheating --; column 5, line 1, for "ter" read -- after --.

Signed and sealed this 1st day of May 1962.

(SEAL)
Attest:

ERNEST W. SWIDER                          DAVID L. LADD
Attesting Officer                             Commissioner of Patents